United States Patent [19]

Wu et al.

[11] Patent Number: 5,842,107
[45] Date of Patent: Nov. 24, 1998

[54] SINTERING PROCESS FOR AlN POWDER COATED WITH AL FILM

[75] Inventors: Nan-Chung Wu; Huei-Jung Wang; Shin-Gei Chen, all of Tainan, Taiwan

[73] Assignee: National Science Council, Taipei, Taiwan

[21] Appl. No.: 521,740

[22] Filed: Aug. 31, 1995

[51] Int. Cl.[6] .................................................. B22F 3/12
[52] U.S. Cl. .............................. 419/13; 419/35; 419/38; 419/54; 419/57
[58] Field of Search ................................ 419/13, 35, 38, 419/57, 54

[56] References Cited

U.S. PATENT DOCUMENTS

| | | | |
|---|---|---|---|
| 4,770,701 | 9/1988 | Henderson et al. | 75/232 |
| 4,793,967 | 12/1988 | Pryor et al. | 419/19 |
| 5,070,591 | 12/1991 | Quick et al. | 29/527.4 |
| 5,173,107 | 12/1992 | Dreyer et al. | 75/229 |
| 5,352,522 | 10/1994 | Kugimiya et al. | 428/403 |
| 5,436,080 | 7/1995 | Inoue et al. | 428/546 |

OTHER PUBLICATIONS

Lenel, Fritz V., "Power Metallurgy, Principles and Applications", Metal Powder Industries Federation, 1980, pp. 143–154.

*Primary Examiner*—Edward A. Miller
*Assistant Examiner*—Daniel Jenkins
*Attorney, Agent, or Firm*—Beveridge, DeGrandi, Weilacher & Young, L.L.P.

[57] ABSTRACT

This patent application discloses a new process for preparing the sintered article of aluminum nitride at low temperature. It comprises coating aluminum metal film on aluminum nitride powder, then directly molding or homogeneously cold pressing, followed by sintering at 1650~1750° C., and finally forming dense aluminum nitride article.

8 Claims, 13 Drawing Sheets

Fig. 1

Scrubbing the chip package
for the oil with alkali or
acid solution
↓
Cleaning out the oxidant
with acidic solution
↓
Zn displacement
↓
Processing the electroless
Ni-Cu-P under the strong
reductant solution
↓
Dipping the chip package
vertically into an organic
solution as flux
↓
Depositing a dip slodering on
Al pad under the solution which
is prepared in a melting Sn bath

Fig. 3

Put aluminum nitride powder
into certain containers
↓
Hang metallic aluminum wire
on a heating tungsten
↓
Use rotary mechanical pump to suction
it to vacuum degree of $2\sim5\times10^{-2}$ torr
↓
Suction for vacuum to vacuum degree
$10^{-4} \sim 10^{-5}$ torr
↓
Raise its temperature to 750 °C
for 2 hours
↓
Raise to 1450 °C for 3 hours Fig. 11A
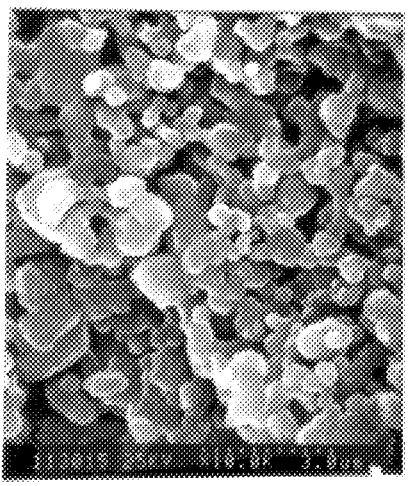
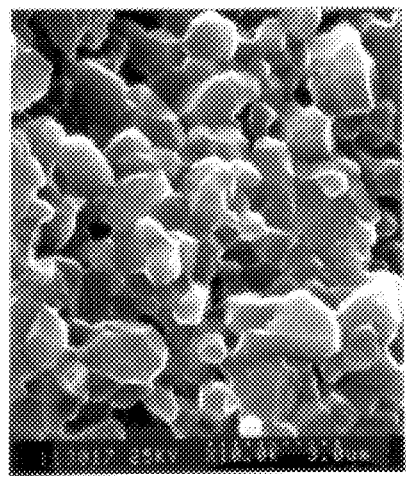
Fig. 11B
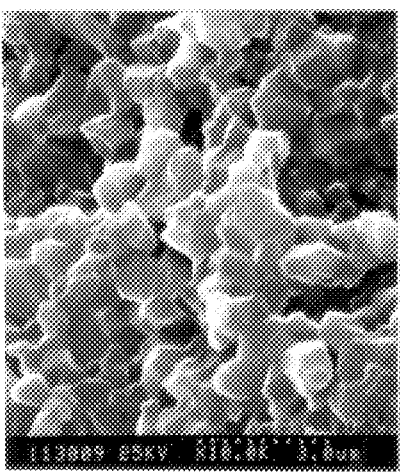
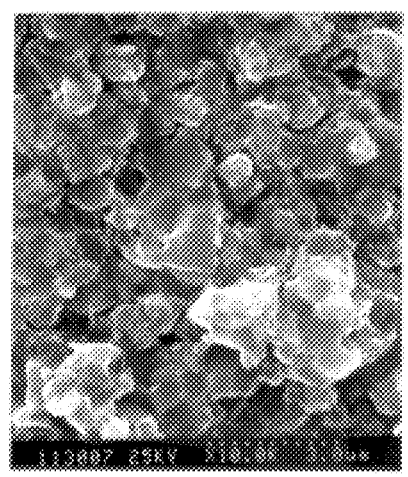
Fig. 11D
Fig. 11C
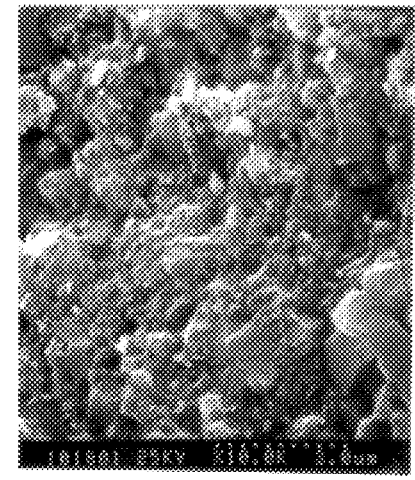
Fig. 11E Fig. 12A
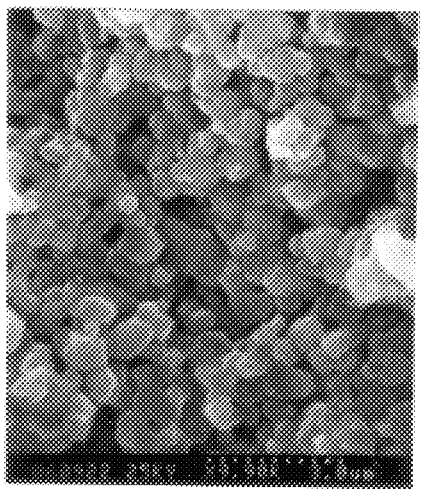
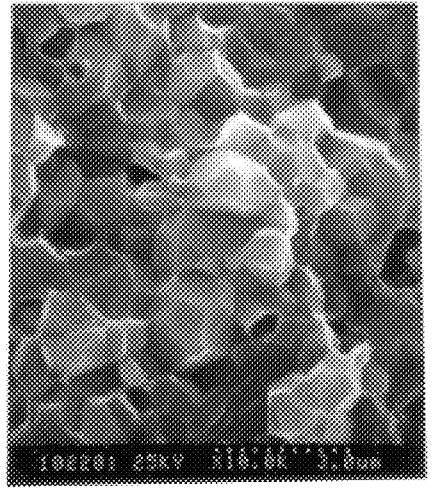
Fig. 12B
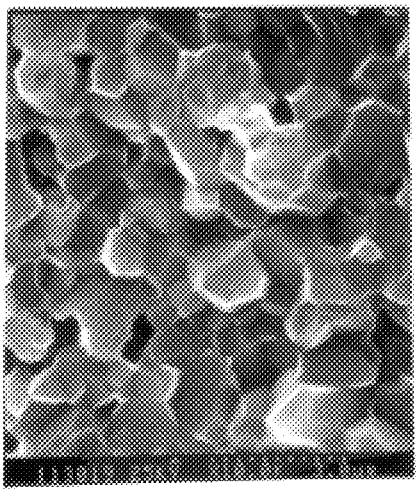
Fig. 12D
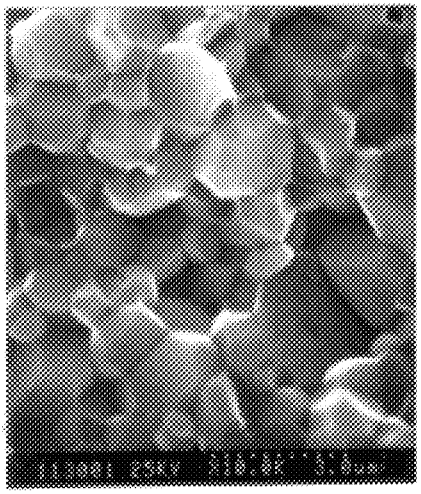
Fig. 12C
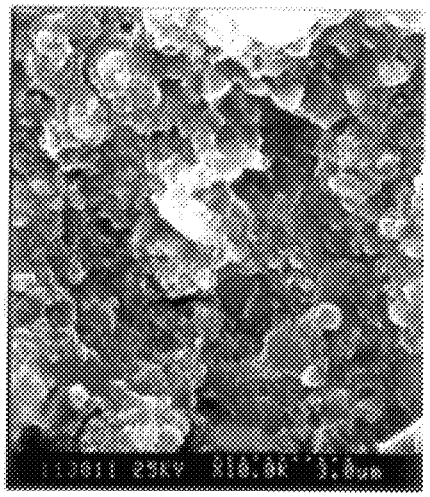
Fig. 12E Fig. 13A
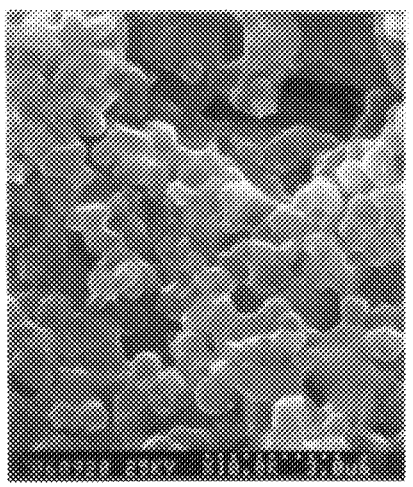
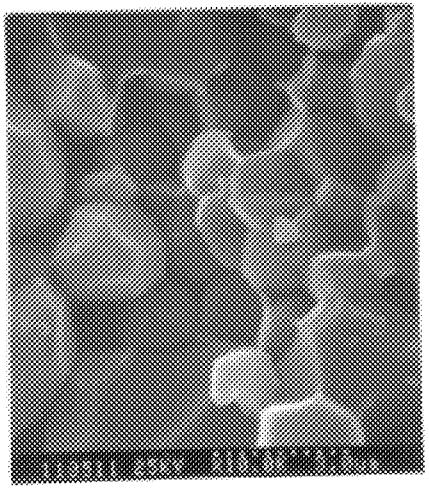
Fig. 13B
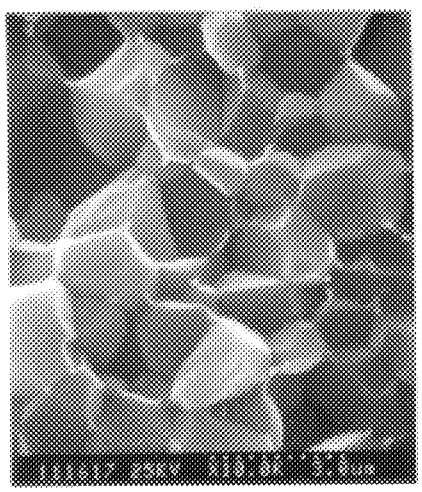
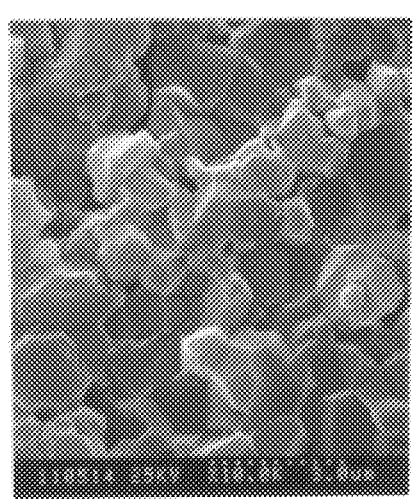
Fig. 13D
Fig. 13C
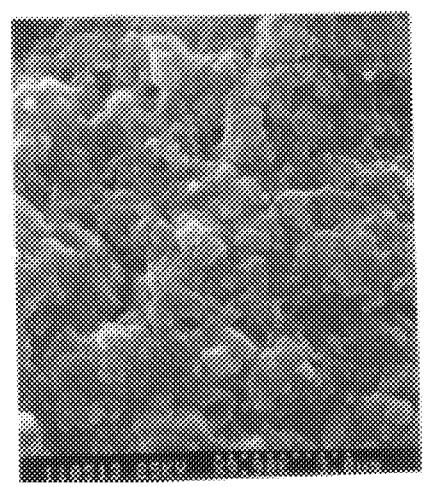
Fig. 13E

SINTERING PROCESS FOR AlN POWDER COATED WITH Al FILM

BACKGROUND OF THE INVENTION

In order to meet the requirements of small size and lightweight for modern electronic products, the semiconductor industry hope that the integrated circuit and electronic system must have the characteristics of high integrated density, high functionization, high speed and high power efficiency. Therefore, the demand for laminate which will support above mentioned electronic components gradually become more strict. In general, there are some basic requirements for laminate as follows: 1. high thermal conductivity; 2. thermal expansion coefficient must be similar to the raw material for chip such as silicon single crystal; 3. low dielectric constant and loss factor; 4. high insulation electric resistance.

Currently there are two kinds of laminate material which can meet above mentioned specifications. One is made from sintering the composition consisting of primarily aluminum oxide-glass base (CaO— $SiO_2$— MgO— $B_2O_3$) or BaSn $((BO_3)_2)$ at low temperature. Although its thermal expansion coefficient, dielectric constant, loss factor and high insulation electric resistance can meet the former requirements, its lower thermal conductivity becomes a big disadvantage. However, its low manufacturing cost and easily to form laminate make manufacturers like to develop such kind of laminate.

The other material has high thermal conductivity. Following the trend of increasing high integrated density and high functionization of integrate circuit, computer has progressed from a general IC to LSI even to VLSI. When it is in operation, it will produce 2 $W/cm^2$ heat. If the heat can not be dissipated, it will not make the whole network work regularly. Therefore, a laminate with high thermal conductivity containing the material such as beryllium oxide (BeO), silicon carbide (SiC), aluminum nitride (AlN), etc., has been developed. Although the thermal conductivity of beryllium oxide can reach 240 W/mk and it is a very ideal choice, its extremely poisonous makes it can not become popular. Until now, only one manufacturer still produces it.

The thermal conductivity of the laminate based on silicon carbide is up to about 270 W/mk. It still must be added 1 wt % beryllium oxide (BeO) for promoting its sintering at about 1900° C., and after sintering it must be thermall pressed. Because it also contains poisonous compound, only Hitachi company produce it. Because aluminum nitride has high thermal conductivity and is able to sinter to form dense sintered article by the addition of sintering-aid agent at below 1800° C. under ambient pressure, it will be the most ideal material. So the laminate based on it becomes the research and development topic for most companies and research institutes.

In practice aluminum nitride still has some problems. For example, without adding sintering-aid agent, the better sintered article must be sintered/formed at 2400° C. Therefore, it is usually formed to dense state by heat press method. Recently obuyuki, Kuramoto et al. obtained 99% theoretical density of pure aluminum nitride sintered article at 1900° C. by controlling the granule diameter of powder on the average 1.5 $\mu$m and 5 vol % of it over 5 $\mu$m. M. Hirano et al. obtained a translucent aluminum nitride sintered article under ambient pressure at 1900° C. for 8 hours. It has 99.6% of relative density.

According to the paper of Tulins C. Schuster et al., the dense aluminum nitride can be prepared under ambient pressure if the sintering-aid agent meets the following requirements: 1. the material which is chemical compatible with aluminum nitride during sintering, i.e., which can react aluminum nitride at high temperature to form new solid phase or new solid solution that is not suitable for use; 2. the material which can form liquid phase and accelerate densification at 2000° C.-even increase its temperature to degradation temperature, its diffusion coefficient is still low. So it must be added such kind of sintering-aid agent; 3. the material with high electric resistance-avoid the influence of insulation property after sintering because of the effect of minor phase on crystal interface of aluminum nitride.

Currently companies which have involved in the development of aluminum nitride (AlN) laminate include Toshiba, Tokuyama soda, NEC, Sumitomo metals, Hereaus, etc. and other research institutes. Those sintering-aid agent have been used include s various oxides, fluorides and chlorides etc. Their effects on the sintering of aluminum nitride are respectively described as follows.

In order to improve the defect of hard sintering of aluminum nitride (AlN.) under ambient pressure, Toshiba add the sintering-aid agent, $Y_2O_3$, in the preparation process. This liquid phase sintering can form dense sintered article. The sintering-aid agent finally forms the phase of YAG $(3Y_2O_3 \cdot 5Al_2O_3)$ or as $YAO_3$ phase, which exist in the interface of crystal particle. Then it will decrease the thermal conductivity. Its product is sated by a brand name Tosnite, whose thermal conductivity is about 100 w/mk.

Besides $Y_2O_3$ and calcium oxide (CaO) can be used as effective sintering-aid agent according to its integrate research, there is another one, rare earth fluoride ($YF_3$). Adding 3 wt % of $YF_3$ into AlN, then sinter it for 2 hours at 1800° C. under ambient pressure and nitrogen, the laminate with thermal conductivity 180 w/mk will be formed. Under the same condition but adding 7 wt % $Y_2O_3$, the laminate with thermal conductivity 170 w/mk will be formed. Both sintered articles emerge YAG, $Al_2Y_4O_9$, $YAlO_3$, etc. heterogeneous phase in the interface of different crystal particle, it increases with the addition of $Y_2O_3$. Investigating the sintering article by SEM, It will know that 1 wt % $Y_2O_3$ exists in the interface of crystal particle by liquid phase. But adding 3 wt %, it will exists in the 3 significant point of the interface of crystal particle, and the thermal conductivity of the sintered article is better than that of adding of 1 wt %$Y_2O_3$.

Tokuyama Soda Co. has developed a powdering technology of aluminum nitride, which can produce the first particle with about 0.6 $\mu$m diameter by reduction-nitridation and the particle with about 1.4 $\mu$m average diameter after coagulation. Without adding any sintering-aid agent, thermally pressing it at 1750 ° C. can form dense article. Sintering it under ambient pressure at increasing temperature to 1900°–2000° C., the densification degree of sintering can reach 95% theoretically. And its thermal conductivity is 140 w/mk. Kuramoto of the same company used Ca $(NO_3)_2$ as sintering-aid agent and found that calcium aluminate will volatilize during sintering. It can form dense sintered article at 1800° C. for 3 hours.

Takao at the Central Research Institute of Sumitomo Metals Industrial Co. has ever researched the relationship of thermal conductivity and the diameter of crystal particle of sintered articles and found that the sintered article with high thermal conductivity has tiny structure. Add 0.5~3 wt % of $Y_2O_3$ as sintering-aid agent and set 1700° C., 1800° C., 1900° C. as sintering temperature and sinter it under nitrogen and ambient pressure for 3 hours. It can find that there is YAG phase existing in the intersection of 3-grains boundary. The result is the same as above mentioned Toshiba's. The sintered article has the thermal conductivity of 122 w/mk when it is added 3 wt % of $Y_2O_3$ and sintering at 1900° C.

Thomas B. et al. found that simultaneously adding the mixing sintering-aid agent consisting Of $Y_2O_3$, calcium oxide (CaO), cerium oxide ($CeO_2$), $La_2O_3$ and silicon oxide ($SiO_2$) can form dense sintered article at 1600° C., which is the most famous development.

Up to now, the development of sintering technology of aluminum nitride in industry are in the following patents: J. Pat. No. P 4-92868 of Tokuyama Soda Co. in 1992 disclosed the preparation method of a sintered article that add 5 wt % of $Y_2O_3$ and organic binder into aluminum nitride powder, and coat the colloid on the surface of a thin knife, then sinter it at 1800° C. for 5 hours. J. Pat. No. P 3-193669 of Kyoto Ceramics Co. disclosed the preparation method in 1991 that sinter the composition consisted of 0.1~15 wt % rare earth aluminum compound and a black agent containing metallic molybdenum or carbonized molybdenum at 1820° C. for 3 hours.

J. Pat. No. P 3-279264 of Toshiba Co. disclosed the preparation method in 1991 that first mold aluminum nitride powder without adding sintering-aid agent, then remove binding agent at 700° C. Introduce nitrogen at ambient pressured (1 atm.), heat press (HP) and sinter it for 4 hours at 1800° C., finally put it into a graphite crucible and heat treat it for 6 hours at 1900° C. to form sintered article with high thermal conductivity. J. Pat. No. P 4-40600 in 1992 disclosed the coloring aluminum nitride and its preparation method, which comprises adding alkali earth compound and 0.5~10 wt % rare earth compound and sintering it at 1850° C. for 48 hours.

J. Pat. No. P 4-0172 of kawasaki Seitotsu Co. disclosed the preparation method in 1992 that add 5 wt % of $Y_2O_3$ moldings into a container made from boron nitride or boron nitride and aluminum nitride, then sinter it at 1900° C. for 4 hours. J. Pat. No. P 4-92867 of Sumitomo Electric Industrial Co. disclosed the coloring aluminum nitride sintered article with high thermal conductivity and its preparation method, which comprises adding 0.05~0.5 wt % compound containing boron carbide, <1 wt % rare earth aluminate and 0.01~15 wt % compound that is at least one selected from IVB, VP, VIB of periodical table, then sintering it to form the coloring sintered article. Or Pat. No. P 4-16503 of Torax Co. disclosed the process in 1992 that can prevent the reaction of aluminum nitride and water by coating one layer of resin on the surface of aluminum nitride powder.

According the above mentioned informations, except the special one, J. Pat. No. P 4-46060, the rest all used oxides or non-oxides as sintering-aid agent for sintering aluminum nitride. Among such preparation methods, the addition of sintering-aid agent of oxides such as $Y_2O_3$, CaO etc. or non-oxides such as $YF_3$, $YCl_3$, $YC_2$ etc. resulted a heterogeneous phase into the aluminum nitride (AlN) sintered article and decreased its thermal conductivity. Even adding sintering-aid agent in the former preparation processes, it still need to be sintered at above 1800° C. Even spending a lot of time for removing carbon which derived from the addition of organic binder during sintering, the laminates still have deposited free carbon, that will influence laminate's quality.

The invention discloses a sintering process without adding any sintering-aid agent. It only needs to coat a aluminum (Al) film on the surface of aluminum nitride powder granule, then mold it or primarily mold and followed by cold homogeneous pressing. The process does not need to add sintering-aid agent or use organic binder, therefore, there is not other phase existing in the aluminum nitride sintered article and any deposited carbon. Even not undertaking the long term removal of carbon, the thermal conductivity of the sintered article and the quality of the laminate are not influenced. The sintering temperature of the invention is only 1750° C., which is below general situation, 1800° C. Its sintering time only needs 3~6 hours to form dense sintered article, and its densification degree can approach theoretical value.

Coating aluminum film on the surface of aluminum nitride powder granule can be simply implemented by vacuum deposition and coated a aluminum layer on the surface of aluminum nitride powder granule in a short term period. The coating method of aluminum film on aluminum nitride can be selected from sputtering method disclosed on A. Grisel et al., Chem. Sen. Tech. V.2 (1989), or other methods such as dipping, spin coating, which need longer coating time. Aluminum nitride powder which is suitable for the invention can be prepared by various methods such as reduction-nitridation or heating nitridation of metallic aluminum powder or gasification.

The invention specifies a method that aluminum nitride powder can be coated by aluminum film and formed to sintering article at low temperature. The main purpose of the invention is that does not need to add any sintering-aid agent and can be formed to dense sintering article at low temperature.

The second purpose of the invention is that does not need to add any other heterogeneous sintering-aid agent and can reduce sintering temperature. So there is no other phase existing in the sintered article. For this reason, its conductivity or quality will not be influenced.

The manufacturing steps are: powder screening; vacuum deposition; dry press molding; cold homogenous pressing; and sintering of the invention. Aluminum nitride powder can be prepared by reduction-nitridation or heating nitridation of metallic aluminum powder or gasification. The average diameter of powder particle is only 0.7 μm, so it can be easily coagulated by static current. When the particle's diameter is over 0.7 μm, it must be screened out. The powder diameter resulted from screening over 100 mesh screen is too fine, so it recoagulate easily after coating aluminum film on the powder. If the mesh of screen is too small, the size of coagulate will have a big deviation and affect film's uniformity. The most preferred screen in operation is 100 mesh screen. Using it the recoagulation phenomenon is not serious and the deviation of coagulate is not big, too.

The vacuum deposition equipment used for the aluminum coating on surface of aluminum nitride powder in the invention is shown in FIG. 2. Put aluminum nitride powder into certain containers and settle it in a vacuum room, weigh certain amount of metallic aluminum wire and hang it on a heating tungsten. Suction for vacuum to vacuum degree to $10^{-4} \sim 10^{-5}$ torr, which make aluminum enough for coating powder.

Hydraulic press molding the aluminum nitride with coated aluminum film, then keep pressure by cold homogeneous press. Put molded test species into boron nitride crucible which have been paved boron nitride powder. Then put it into furnace to remove residual oxygen and water which are absorbed on the wall of reactor. Followed by keeping the pressure of reactor below 1.04 atm. by introducing 99.9% high purity of nitrogen. Raise its temperature to 750° C. for 2 hours and then raise to 1450° C. for 3 hours. Finally raise to specified temperature and keep it for sintering.

In order to reach the desired vacuum of vacuum chamber in the above mentioned manufacturing method for coating aluminum film, generally in the first stage use rotary mechanical pump to suction it to vacuum degree of $2\sim5\times10^{-2}$ torr. Until it reaches specified vacuum, the valve should be slowly opened to avoid the suction of powder. Then use diffusion pump to reach vacuum below $2\sim5\times10^{-4}$ torr. For reaching uniform deposition of powder, powder should be uniformly distributed in the container. After depositing aluminum film and staying for cooling, turn the powder and repeat the former deposition process until specified aluminum amount has been deposited.

The aluminum nitride specimen prepared according to the invention, it can be tested by examining the following physical and electric properties: original (before sintering) density, density of sintered article, dielectric constant (k), linear contractibility (shrinkage, before and after sintering) loss factor (tan δ), crystal size, insulation electric resistance coefficient (ρ), thermal conductivity, etc. And analyze Its microstructure by X-ray diffraction, SEN, EPMA and STEM.

Respectively investigating raw materials such as aluminum nitride powder, sheet type metallic aluminum sheet, aluminum nitride with coated aluminum film and aluminum nitride sintered article by X-ray diffraction, the result are shown as FIG. 4. The diffraction figure of aluminum nitride coated aluminum has more weak peak than raw material, aluminum nitride, has. Those weak peaks belong to the diffraction peak of aluminum, which show that metallic aluminum is coated on the surface of aluminum nitride powder after evaporation deposition. Again investigate the diffraction pattern of sintered article and confirm that the weak metallic diffraction pattern has been completely disappeared after sintering. This show that the metallic aluminum has been sintered and completely convert to aluminum nitride. Comparing the diffraction patterns of sintered article and raw aluminum nitride powder, the sintered article has one more weak peak at $2\theta=26.69°$ place.

According to the report on the sintering model of aluminum nitride without adding sintering-aid agent of Takahashi et al. (The Special Collection of High Thermal Conductive Ceramics in 1986) they pointed out that because the granule surface of aluminum nitride powder has the protection layer of aluminum oxide, so after sintering at 2000K, aluminum nitroxide (Spinel, AlON) solid dissolving phase can be formed at the interface of aluminum nitride and aluminum oxide. Therefore, the weak diffraction peak will be the solid dissolving phase of nitroxide (AlN) or the evaporated coated aluminum film reacted with air to form aluminum oxide.

After sintering the prepared aluminum nitride with different amount of coated aluminum film according to the invention respectively at 1700° C., 1750° C. for 3 hours, the relationship between their linear shrinkage, relative density and coated aluminum amount are shown as Table 1 and FIG. 5. Their value increase with coated aluminum amount. The specimen coated with 1.5 wt % of aluminum can approach theoretical value, while the coated aluminum amount is over 1.5 wt %, both values will decrease. Therefore, it clearly shows that it is good for the sintering of aluminum nitride when the coated aluminum amount is in a certain range. Excess coated aluminum is not good for sintering and prevents it from the progress of sintering.

The sintered article with 1.5 wt % coated aluminum obtained at 1700° C., whose relative density can reach 90.54% of theoretical value, and Its linear shrinkage is about 13.3%. Raising the sintering temperature to 1750° C. and the coated aluminum amount is 5 wt %, the relative density and linear shrinkage of the rest specimens tested according the former conditions are higher. The effective coiled aluminum amount is between 1 wt % to 3 wt %. The relative density of specimens in the above region is above 90% of theoretical value. The most preferred with 1.5 wt % coated aluminum can reach 95.09 of theoretical value, and its linear shrinkage is 16.67%.

Aluminum nitride coated with different amount of aluminum and sintered respectively at 1750° C. for 1, 3, 6 hours, their results are shown as Table 2, and their relation between relative density, linear shrinkage and coated aluminum amount are shown as FIG. 6 and 7. Sinter aluminum nitride with different amount of coated aluminum for 1 hour, although the density and linear shrinkage are obviously lower. The result of aluminum nitride specimen coated with 0.67~2.12 wt % of aluminum film are better than those without coated aluminum. Among them the specimen coated with 1.3 wt % of aluminum has the best result. Its sintered article density is V77.91% of theoretical value, linear shrinkage, 13.17%. Sintering the specimen with 1.5 wt % of coated aluminum, its density can reach 95.09% of theoretical value and linear shrinkage, 16.67%.

Accordingly, the ideal amount of coated aluminum is about 0.67 to 2.8 wt %. Long term sintering can make the density and linear shrinkage reach theoretical value. Keeping the temperature for 6 hours, the result clearly showed that the effect of the amount of coated aluminum on the sintering of aluminum nitride. When coated aluminum amount is 3.53 wt %, its density becomes 76.38% of theoretical value and linear shrinkage is only t7.67%. For the specimens with the amount of coated aluminum 0.43 wt % and 1.5 wt % respectively, their sintered article's density can reach 99.69% and 99.39% of theoretical value and linear shrinkage are about 16.67%. Based on the above mentioned result, it can conclude that the dense sintered article can be obtained by sintering aluminum nitride powder with 0.47~1.5 wt % of coated aluminum for 6 hours at 1750° C.

Comparing the samples with the same amount of coated aluminum, 2.5 wt % but keep heating 3 hours and 6 hours respectively. No matter density or linear shrinkage, the test result of the latter sample is worse than the sample of the former, which clearly shows that coating too much aluminum will hinder the sintering of aluminum nitride. Therefore, the amount of coated aluminum in certain range can promote the sintering of aluminum nitride. The range can be widened followed by the increase of keeping heating time, so the effective coated range is function of heating time.

The microstructure of aluminum nitride with different amount of coated aluminum sintered at 1700° C. for 3 hours show as FIGS. 11A–11E. The photo 1-*a* is pure aluminum nitride without coated aluminum, and there are a neck phenomena between granules, obvious size variation between crystal particle, more residual pore and not clear interface of crystal.. Accordingly, the sintering is not complete. This results from low sintering temperature and without liquid phase promotes the rearrangement of granule, therefore, the very low diffusion rate makes the crystal easily grow at dense granule region. As the result, the size variation of crystal becomes so obvious. Its density is only 85.89% of theoretical value and the linear shrinkage lowers to 10.47%.

The FIG. 11A have more residual pore then FIG. 11B which coated aluminum 0.67 wt % but. FIG. 11B shown crystal particle and interface of crystal are clear. Its density is only 87.42% of theoretical value. The microstructure of sample which coated aluminum 1.5 wt. % show as FIG. 11C, its highly density is 90.59% of theoretical value after sintered at 1700° C.

The FIG. 11D haven't more residual pore then FIG. 11B or 11C, but can be obtained some vacuum. In the interface of crystal particle, or vacuum which were some aluminum then 5 wt % to sintered, since more aluminum nitride powder at the interface of crystal particle, or vacuum which interfere sintered.

The microstructure of aluminum nitride with different amount of coated aluminum sintered at 1750° C. for 3 hours show as FIGS. 12A–12E. This results from there are little residual pore and crystal particle, show the sintering have practiced preferable on FIGS. 12A–12E. The density of 0.67 wt % coated aluminum sintered was low then 2.8 wt % coated, the phenomenon was contrary to sintered at 1700° C. which described as FIGS. 11A–11E. The micro structure of coated much aluminum sample have less aluminum nitride powder at the interface of crystal particle, after sintered at 1750° C.

Accordingly, the sintering method was described as FIGS. 12A–12E the sample sintered at 1750° C. for 6 hours show as FIGS. 13A–13E. As lengthen sintered time the aluminum diffused preferable. There residual pore was decreased and crystal particle size was lengthen. Its density is only 89.87% of theoretical value.

From FIGS. 13B and 13C, it can not see voids and the average particle diameter with 2 μm obviously increase. The sintering particle is very dense, which can be corresponded with above 99% of relative density. FIG. 13E coated with excess aluminum, which improve the aluminum nitride microparticle on the surface of aluminum nitride crystal particle and sheet phenomena, and the small block formed on the surface of crystal particle.

In order to evaluate the aluminum nitride prepared according to the invention "the preparation method of aluminum nitride coated with aluminum film" which will be applied to electronic encapsulated laminate. So it must measure some fundamental properties such as insulation resistance, dielectric constant, loss factor, etc. to Laminates.

Measuring electric resistance coefficient at 25 voltage and charge 30 sec. by HP-4329A high electric resistance meter. As shown the electric resistance coefficient in table (3), the density and electric resistance coefficient have the same trend, the sintering article with higher density also has higher electric resistance coefficient. The specimen covered 1.5 wt % of coated aluminum and sintered at 1700° C., its better electric resistance coefficient is about $5.94 \times 10^{10}$Ω-cm. And the specimen sintered at 1750° C., its electric resistance coefficient is $3.4 \times 10^{11}$Ω-cm. Both are in the range of insulation.

Even sinter the specimen coated with suitable amount of aluminum at 1750° C. for 1 hour, its highest density shown as table (2) can reach 77.91% of theoretical value and its electric resistance coefficient shown as table (4) is only $10^{10}$Ω-cm. The specimens sintered for 3, 6 hours respectively, its density can reach 95% an its electric resistance coefficient can reach $10^{11}$Ω-cm. of insulation range.

In order to reduce the decay rate of signal in electric circuit, so the laminate inserted with high frequency components must have lower dielectric constant. Sinter the specimens with different amount of coated aluminum, because their large deviation in density, which resulted into that their specific dielectric constant and loss factor (tan δ) deviates largely with the amount of coat aluminum shown as FIG. (8). The specimen with 1.5 wt % coated aluminum has dielectric constant, 12.09, and loss factor, about 0.2813 (1 KHz), which show that the specimen with higher relative density, its dielectric constant and loss factor can reach more ideal range. The specimens sintered at 1750° C. also have the same trend, but the dielectric constant and loss factor of the specimens coated with different amount of aluminum have small deviation. Extend the sintering time that does not affect the deviation trend greatly, which as shown in FIG. (9) dielectric constant vs. coated aluminum amount and FIG. (10) loss factor (tan δ) vs. coated aluminum amount. The specimen sintered for 3 and 6 hours has the optimum dielectric constant 9.786 and 10.81 respectively and the lowest loss factor 0.0722, for sintered for 6 hours has 0.0173 and 0.0240. The relative density of both specimen are over 95%.

In conclusion, according to the invention "the preparation method of aluminum nitride coated with aluminum", which discloses that after coating aluminum film on the surface of aluminum nitride powder, then directly mold or homogeneously cold press it, followed by sintering at 1650°~1750° C. which is below traditional known temperature, finally form dense aluminum nitride sintering article. Because the invention does not use sintering-aid agents so it can save the mixing time, granulation time and make the process more simply. After investigating its microstructure, property, its property is confirmed to meet the requirement of industry.

The following examples are for the description of goal, method and advantage of the invention in detail but are not to be considered limiting.

BRIEF DESCRIPTION OF THE DRAWINGS

The present invention can be more fully understood by reference with the following detailed descriptions and the accompanying drawings, wherein:

Table 1 shown the relationship between their linear shrinkage, relative density and coated aluminum amount after sintering the prepared aluminum nitride with different amount of coated aluminum film according to the invention respectively at 1700° C., 1750° C. for 3 hours.

Table 2 shown the results Aluminum nitride coated with different amount of aluminum and sintered respectively at 1750° C. for 1, 3, 6 hours.

Table 3 shown the electric resistance coefficient, which measuring at 25 voltage and charge 30 sec. by HP-4329A high electric resistance meter.

Figure 2:
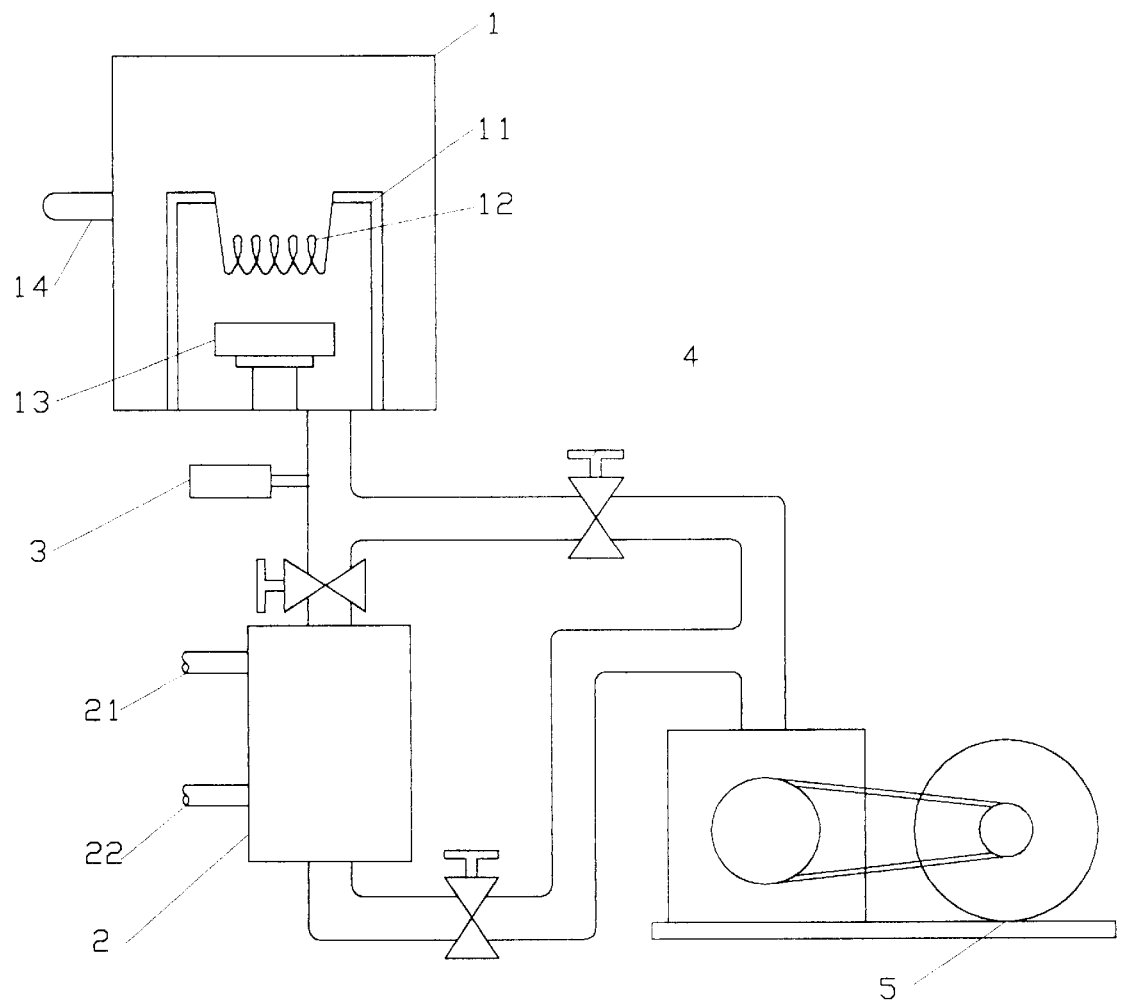

Table 4 shown the theoretical value and its electric resistance coefficient even sinter which coated with suitable amount of aluminum at 1750° C. for 1 hour, 3, 6 hours FIG. 1 is a main flowchart of the invention FIG. 2 is a vacuum deposition equipment used for the aluminum coating on surface of aluminum nitride powder.

FIG. 3 is a main flowchart of depositing aluminum film on surface of aluminum nitride powder.

Figure 4:
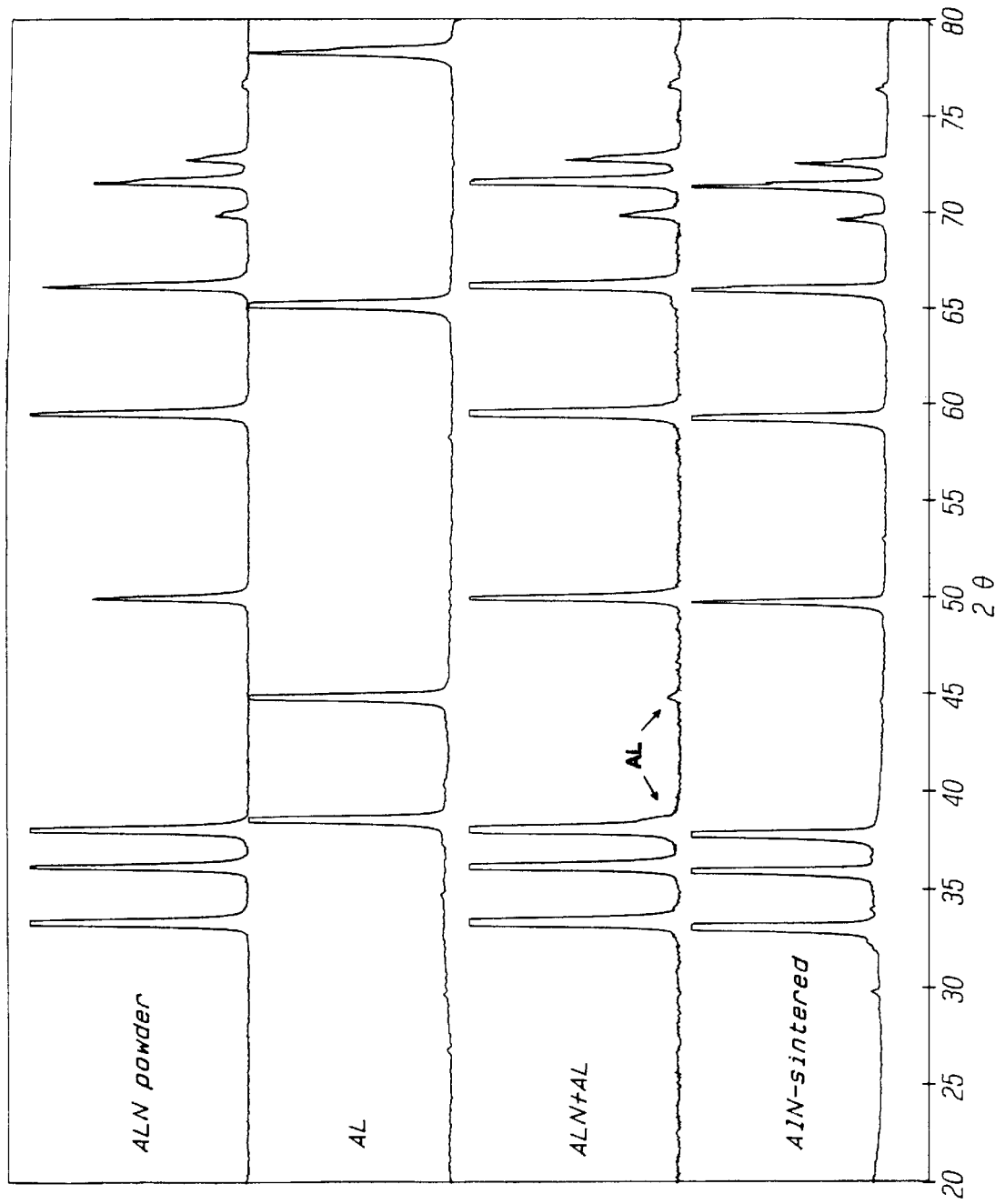

FIG. 4 is an X-ray diffraction patterns of depositing aluminum film on surface of aluminum nitride powder.

Figure 5:
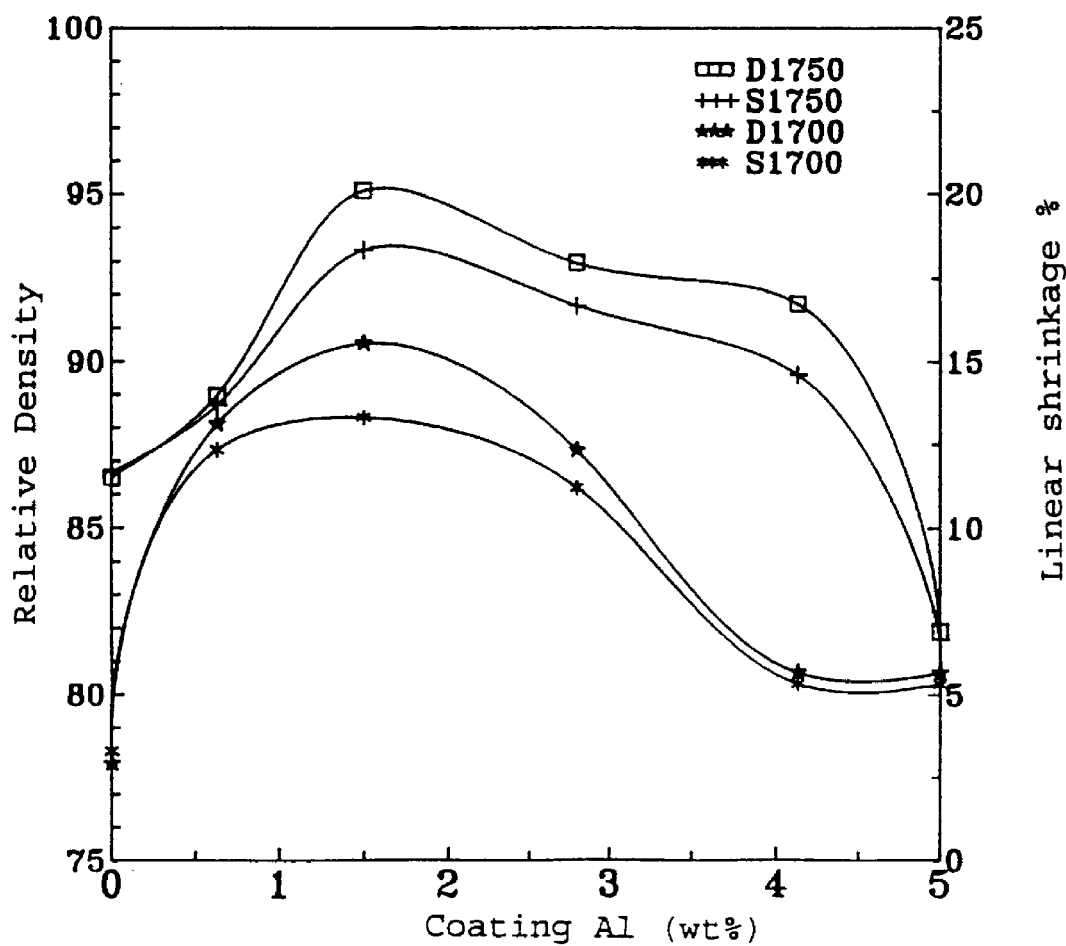

FIG. 5 show the relationship between their linear shrinkage, relative density and coated aluminum amount after sintering the prepared aluminum nitride with different amount of coated aluminum film according to the invention respectively at 1700° C., 1750° C. for 3 hours.

Figure 6:
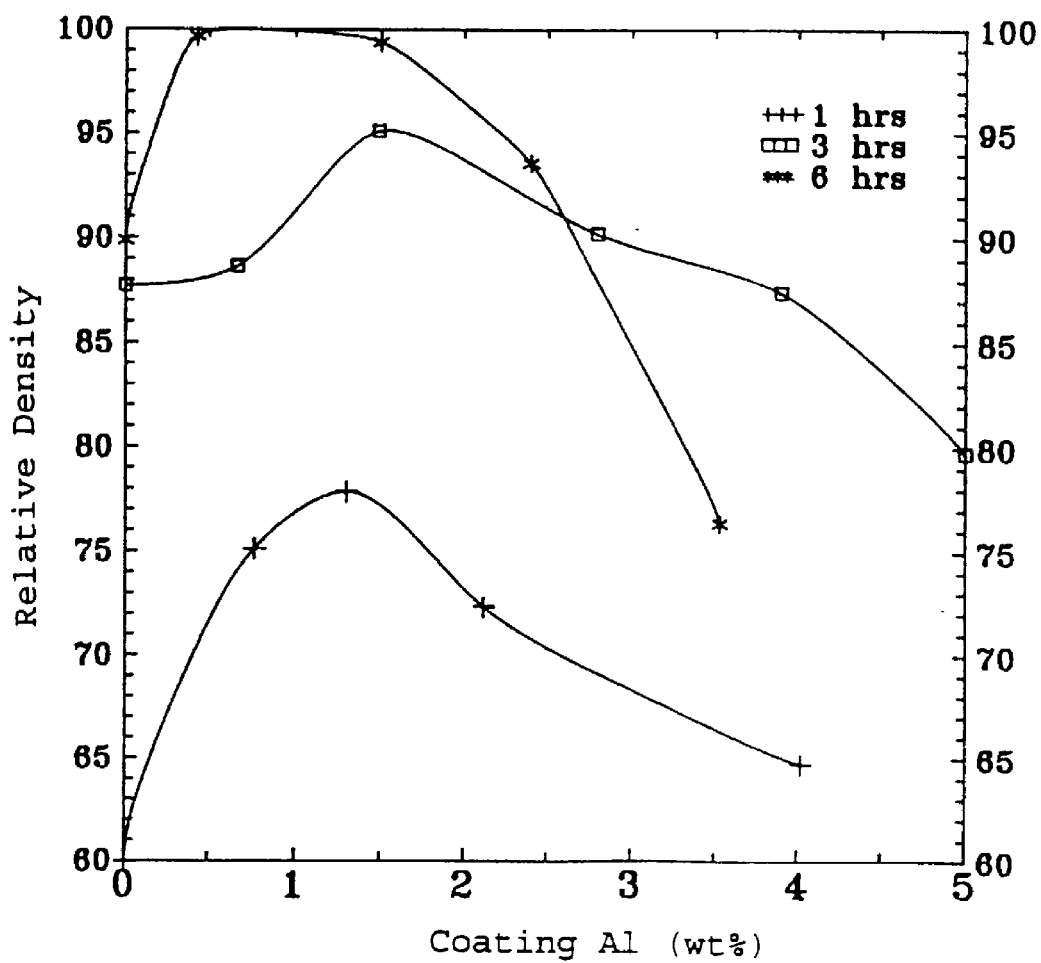
Figure 7:
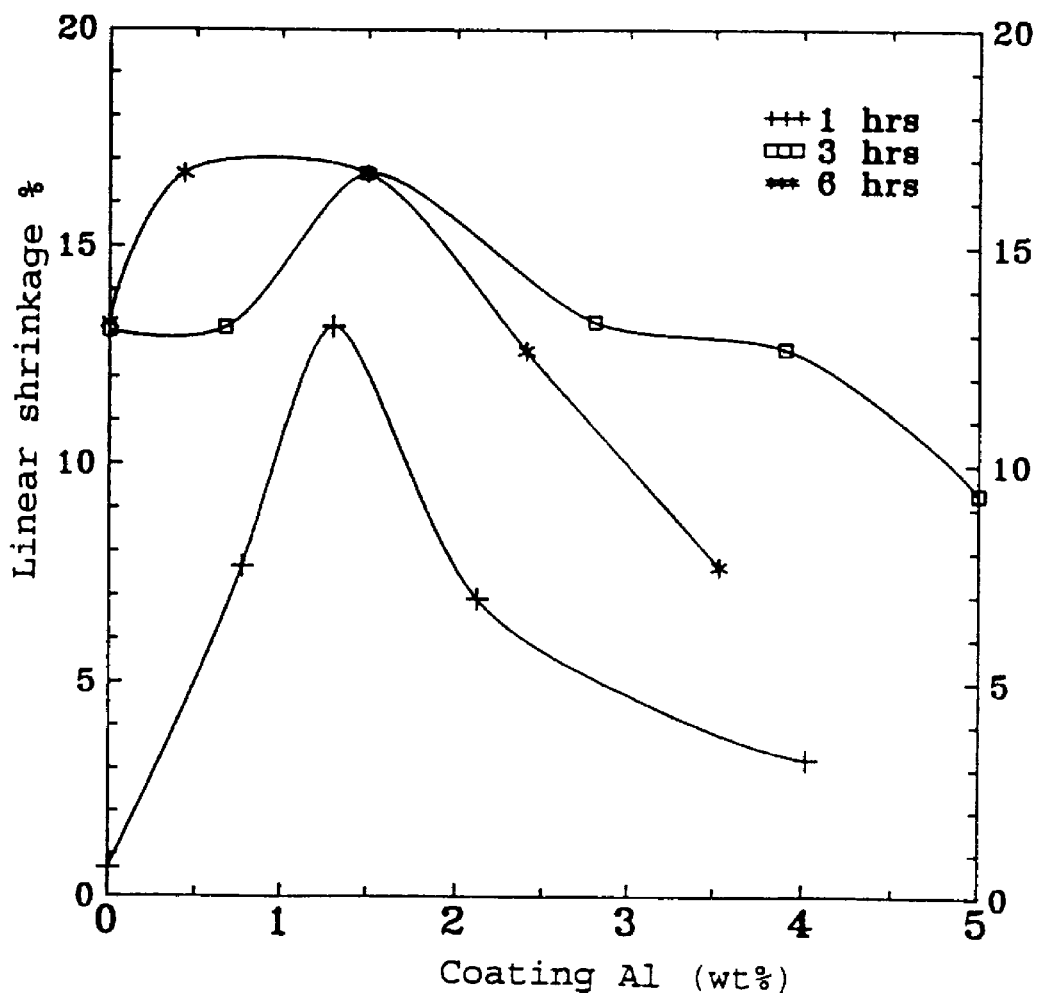

FIG. 6 and 7 Aluminum nitride coated with different amount of aluminum and sintered respectively at 1750° C. for 1, 3, 6 hours.

Figure 8:
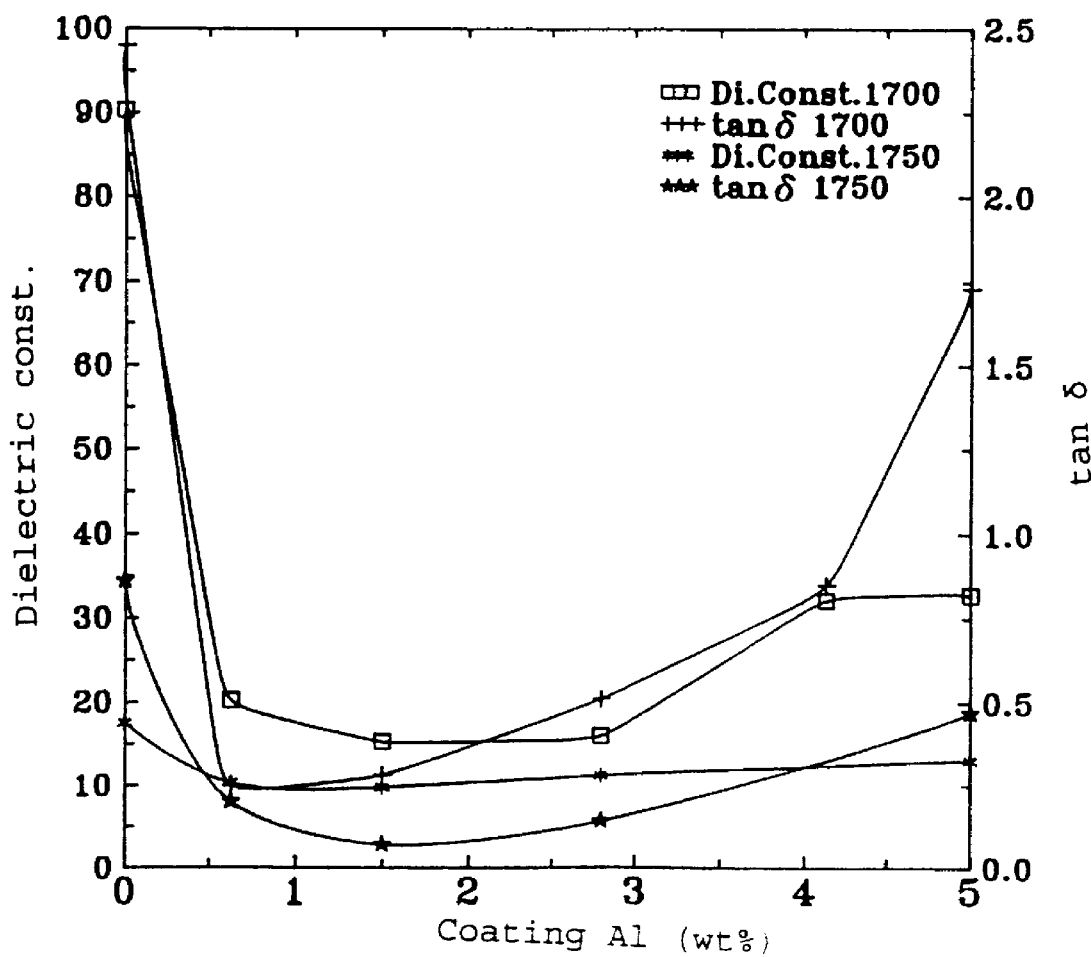

FIG. 8 shown the specific dielectric constant and loss factor (tan δ) deviates largely with the amount of coat aluminum.

Figure 9:
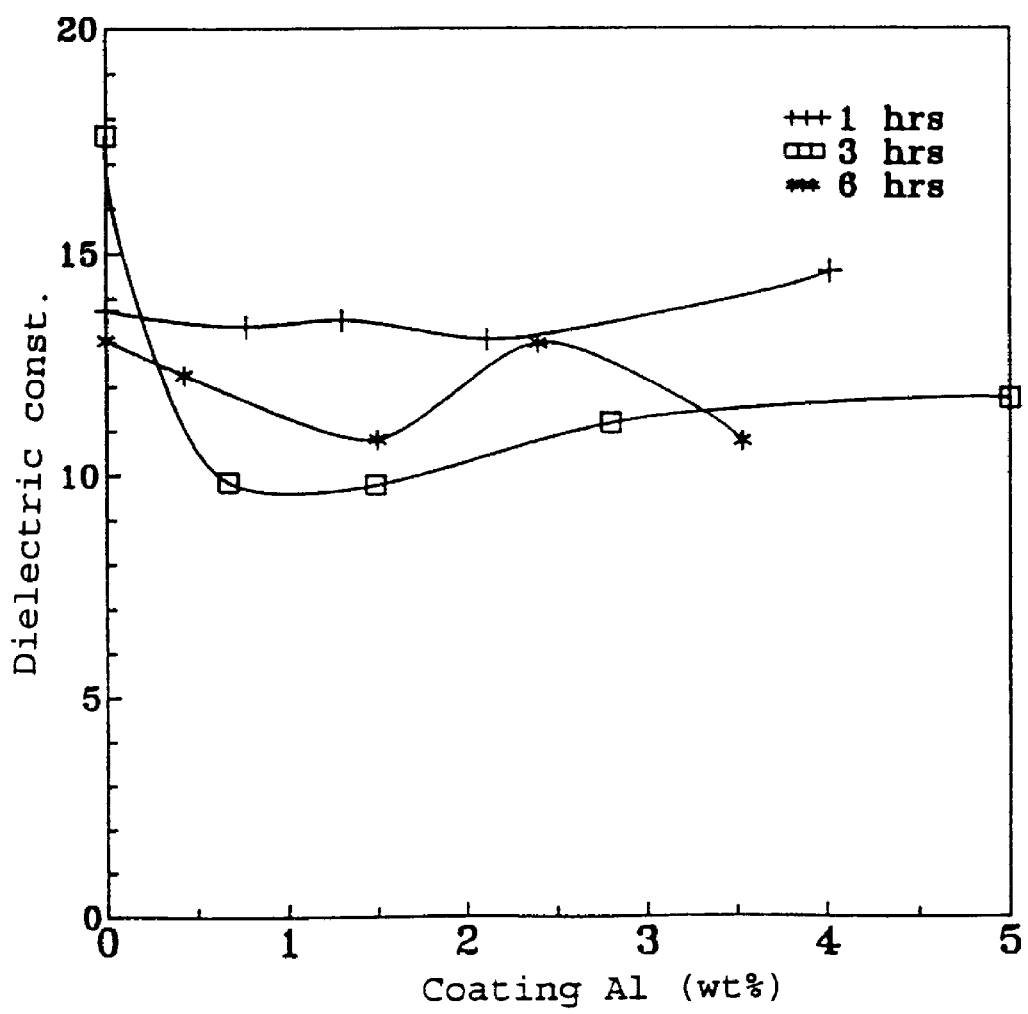
Figure 10:
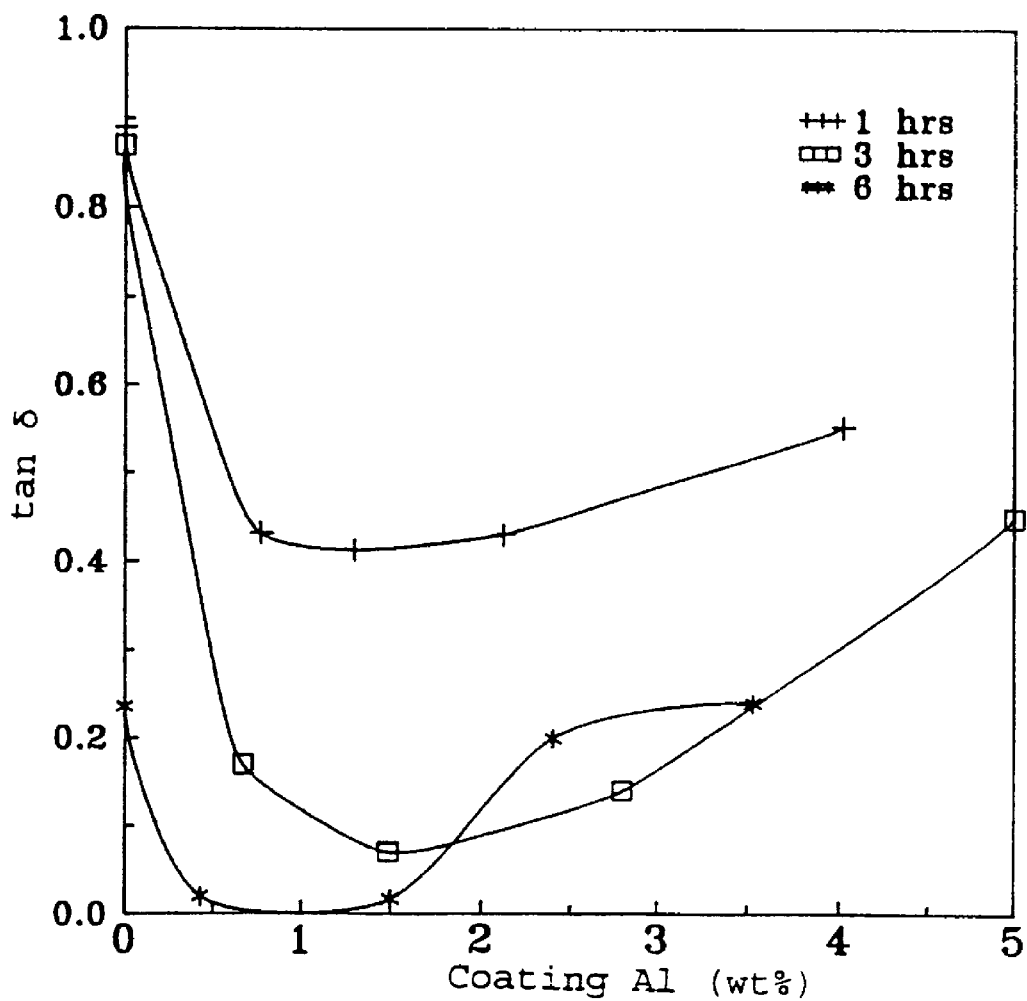

FIG. 9 dielectric constant vs. coated aluminum amount,

FIG. 10 loss factor (tan δ) and dielectric constant vs. coated aluminum amount,

FIGS. 11A–11E shown the microstructure of aluminum nitride with different amount of coated aluminum sintered at 1700° C. for 3 hours, FIG. 11A pure aluminum nitride without coated aluminum, FIG. 11B which coated aluminum 0.67 wt %, FIG. 11C which coated aluminum 1.50 wt %, FIG. 11D which coated aluminum 2.80 wt %, FIG. 11E which coated aluminum 5.00 wt %, FIGS. 12A–12E shown the microstructure of aluminum nitride with different amount of coated aluminum sintered at 1750° C. for 3 hours, FIG. 12A is pure aluminum nitride without coated aluminum, FIG. 12B which coated aluminum 0.67 wt %, FIG. 12C which coated aluminum 1.50 wt %, FIG. 12D which coated aluminum 2.80 wt %, FIG. 12E which coated aluminum 5.00 wt %, FIGS. 13A–13E shown the microstructure of aluminum nitride with different amount of coated aluminum sintered at 1700° C. for 6 hours, FIG. 13A is pure aluminum nitride without coated aluminum, FIG. 13B which coated aluminum 0.67 wt %, FIG. 13C which coated aluminum 1.50 wt %, FIG. 13D which coated aluminum 2.80 wt %, FIG. 13E which coated aluminum 5.00 wt %,

EXAMPLE 1

Take 1 g aluminum nitride (AlN) and screen it by 100 mesh screen, then homogeneously distribute it in culture disk, followed by putting it into a vacuum chamber. Accurately weigh 0.1 g aluminum wire, and hang it on hot tunsten wire. Wait the vacuum degree to $10^{-4} \sim 10^{-5}$ torr, and adjust electric current to 50 A and electric voltage to 3 V. Turn off the current after aluminum melt completely, then wait it for cooling and turn the powder the other side. According to coated aluminum amount, repeat the above mentioned procedures.

Take 1 g of aluminum nitride with 1.5 wt % coated aluminum, and put it into a stainless steel mold with 1.5 cm diameter. Press mold at dry state by hydraulic press at 15 kg/cm$^2$, homogeneously press it at cold state at 2000 kg/cm$^2$ for 1 min to form specimen.

Put the specimen into boron nitride crucible, then lay it in a furnace with $2\times10^{-4}$ torr vacuum degree. Slowly increase the temperature to 300 ° C., then introduce 99.9% nitrogen. Keep the nitrogen pressure at 1.04 atm, followed by increasing temperature to 750° C. by 10° C./min heating rate for 2 hours, then increase temperature to 1450° C. for 3 hours by 5° C./min heating rate, finally increase it to 1700° C. for 3 hours by 2.5° C. heating rate.

EXAMPLE 2~20

As example 1 but according to the conditions of table (5), prepare various test specimens.

TABLE 5

| Heating period | Coated aluminum amount (wt %) | | | | | |
|---|---|---|---|---|---|---|
| 1 Hr | 0.00 | 0.77 | 1.30 | 2.12 | 4.02 | |
| | sintering temp. 1750° C. | | | | | |
| 3 Hr | 0.00 | 0.67 | 1.50 | 2.80 | 5.00 | |
| | sintering temp. 1750° C. | | | | | |
| | 0.00 | 0.63 | 1.50 | 2.80 | 4.13 | 5.00 |
| | sintering temp. 1700° C. | | | | | |
| 6 Hr | 0.00 | 0.43 | 1.50 | 2.12 | 2.40 | 3.53 |
| | sintering temp. 1750° C. | | | | | |

TABLE 1

| | coated aluminum amount (wt %) | | | | | |
|---|---|---|---|---|---|---|
| | 0.00 | 0.63 | 1.5 | 2.8 | 4.13 | 5.00 |
| 1700° C. sintering 3 hours density (D) | 2.54 | 2.87 | 2.95 | 2.85 | 2.63 | 2.63 |
| relative density (RD.) | 85.89 | 87.42 | 90.54 | 87.42 | 84.97 | 80.67 |
| linear sintering(LS.) | 10.47 | 12.33 | 13.33 | 11.20 | 10.07 | 5.33 |
| 1750° C. sintering 3 hours density(D) | 2.82 | 2.90 | 3.10 | 3.03 | 2.99 | 2.67 |
| relative density (RD.) | 87.73 | 88.65 | 95.09 | 90.18 | 87.42 | 79.78 |
| linear sintering(LS.) | 11.07 | 13.15 | 16.67 | 13.27 | 12.67 | 9.33 |

TABLE 2

| 1 Hr | coated Al AMOUNT (wt %) | 0.00 | 0.77 | 1.30 | 2.12 | 4.02 |
|---|---|---|---|---|---|---|
| | relatine density (%) | 60.00 | 75.15 | 77.91 | 72.39 | 64.72 |
| | linear shrinkage (%) | 0.67 | 7.67 | 13.17 | 6.93 | 3.23 |
| 3 Hr | coated Al AMOUNT (wt %) | 0.00 | 0.67 | 1.50 | 2.80 | 5.00 |
| | relatine density (%) | 87.73 | 88.65 | 95.09 | 90.18 | 79.78 |
| | linear shrinkage (%) | 13.07 | 13.15 | 16.67 | 13.27 | 9.33 |
| 6 Hr | coated Al AMOUNT (wt %) | 0.00 | 0.43 | 1.50 | 2.12 | 2.40 | 3.53 |
| | relatine density (%) | 89.87 | 99.67 | 99.39 | 97.55 | 93.56 | 76.38 |
| | linear shrinkage (%) | 13.24 | 16.67 | 16.67 | 16.30 | 12.62 | 7.67 |

TABLE 3

| Ω-cm sintering temp. | coated Al AMOUNT(wt %) | | | | |
|---|---|---|---|---|---|
| | 0 | 0.67 | 1.50 | 2.80 | 5.00 |
| 1700° C. | 2.89 × 10 | 2.1 × 10 | 5.94 × 10 | 8.5 × 10 | 8.4 × 10 |
| 1750° C. | 1.5 × 10 | 2.2 × 10 | 3.4 × 10 | 1.1 × 10 | 4.05 × 10 |

TABLE 4

| sintering 1 hr | coated Al AMOUNT(wt %) | 0 | 0.77 | 1.30 | 2.12 | 4.02 |
|---|---|---|---|---|---|---|
| | resistance coefficient (Ω-cm) | $4.35 \times 10^9$ | $6.2 \times 10^9$ | $1.12 \times 10^{10}$ | $1.8 \times 10^{10}$ | $4.53 \times 10^9$ |
| sintering 3 hr | coated Al AMOUNT(wt %) | 0 | 0.67 | 1.50 | 2.80 | 5.00 |
| | resistance coefficient (Ω-cm) | $1.6 \times 10^{10}$ | $2.2 \times 10^{10}$ | $3.4 \times 10^{11}$ | $1.1 \times 10^{11}$ | $4.05 \times 10^9$ |
| sintering 6 hr | coated Al AMOUNT(wt %) | 0 | 0.43 | 15.0 | 2.40 | 3.53 |
| | resistance coefficient (Ω-cm) | $4.25 \times 10^9$ | $1.37 \times 10^{11}$ | $2.4 \times 10^{11}$ | $1.73 \times 10^{10}$ | $2.8 \times 10^9$ |

What is claimed is:

1. A process for the preparation of an aluminum nitride (AlN) sintered article comprising vacuum depositing a homogeneous layer of aluminum film onto screened aluminum nitride powder to form coated aluminum nitride powder, thereafter molding said coated aluminum nitride powder, cold pressing said coated aluminum nitride powder and sintering at 1650° C. to 1750° C. in a nitrogen atmosphere at ambient pressure to form a densely sintered aluminum nitride article.

2. The process according to claim 1 wherein the amount of said aluminum film on the surface of said aluminum nitride powder is 0.1 to 10% by weight.

3. The process according to claim 1 wherein the amount of said aluminum film on the surface of said aluminum nitride powder is 0.5 to 0.8% by weight.

4. The process according to claim 1 wherein after deposition of the aluminum film on the screen aluminum nitride powder, the temperature is increased to 750° C. in order to melt the aluminum and thereafter increasing the temperature to 1450° C. for three hours and thereafter sintering by increasing the temperature from 1650° C. to 1750° C.

5. The process according to claim 4 wherein the temperature is increased to 750° C. at a heating rate of 10° C./minutes for 2 hours.

6. The process according to claim 4 wherein the temperature is increased to 1450° C. at a heating rate of 5° C./minute.

7. The process according to claim 4 wherein the temperature is increased to 1750° C. at a heating rate of 2.5° C. of minute.

8. The process according to claim 1 wherein the aluminum nitride powder starting material has a particle size of 0.7 microns in diameter.

* * * * *